April 18, 1950  F. E. PAYNE  2,504,937

SELF-CONTAINED MECHANICAL SEAL WITH "O" RING

Filed Nov. 21, 1947

INVENTOR.
Frank E. Payne
BY
Charles F. Vytlak
atty.

Patented Apr. 18, 1950 2,504,937

UNITED STATES PATENT OFFICE 2,504,937

SELF-CONTAINED MECHANICAL SEAL WITH "O" RING

Frank E. Payne, Glencoe, Ill., assignor to Crane Packing Company, Chicago, Ill., a corporation of Illinois Application November 21, 1947, Serial No. 787,281

3 Claims. (Cl. 286—11.14)

This invention relates to rotary mechanical seals and particularly to a self-contained mechanical seal which utilizes as the flexible resilient sealing element thereof a ring of rubber or the like, said ring being circular in radial cross-section.

The principal object of this invention is to provide a self-contained rotary seal wherein the spring used is of minimum diameter so as to secure optimum values of spring pressure with a minimum diameter of spring wire.

A broad object of this invention is to provide an improved rotary mechanical seal of self-contained construction which is adapted to be pressed into a recess in a housing or the like, is easy to assemble and is inexpensive to make.

A specific object of this invention is to provide a self-contained rotary seal of the O ring type wherein the groove in which the ring operates is formed partly by the retainer and partly by a spring-pressed stamping.

Figure 1:
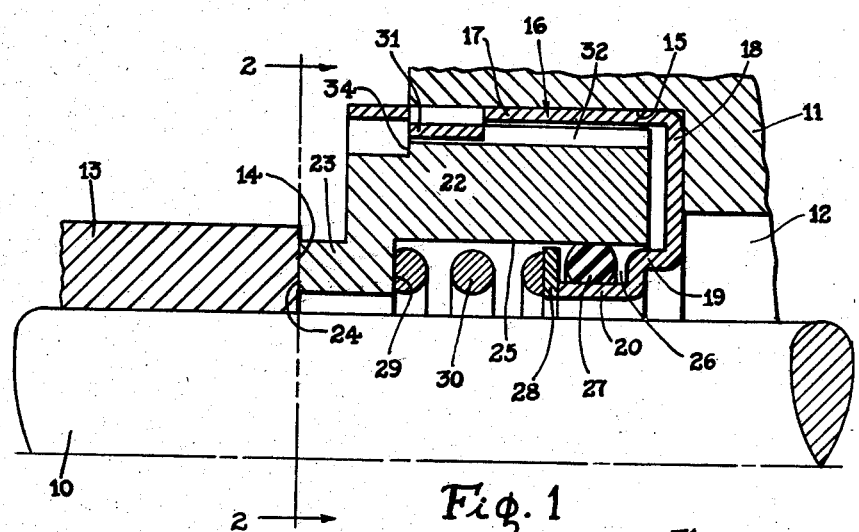
Figure 2:
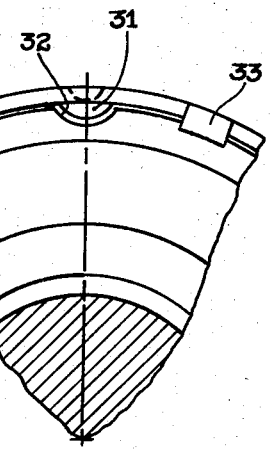
Figure 3:
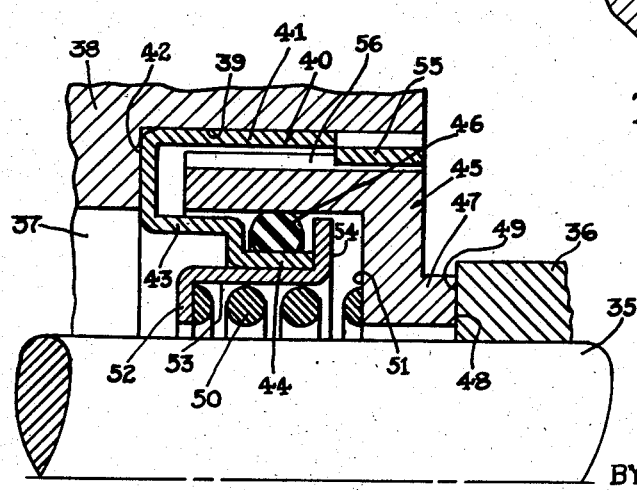

These and other objects of this invention become apparent from the following detailed description when taken together with the accompanying drawings, of which Fig. 1 is a quarter-sectional view through a seal embodying the features of this invention;

Fig. 2 is a fragmentary elevation taken along line 2—2 of Fig. 1 showing the means for preventing relative rotation between the housing for the seal and the sealing washer therein and also showing the means for retaining the sealing washer within the housing; and Fig. 3 is a modification of the seal shown in Fig. 1 wherein the spring passes through the flexible resilient sealing ring.

Turning now to the drawings for a detailed description of the invention, and particularly to Fig. 1, there is shown a shaft 10 which may be a pump shaft, and a fragment of a housing 11 having an opening 12 through which shaft 10 passes. On shaft 10 may be mounted a pump impeller (not shown) having a hub 13 which is pressed upon shaft 10 so as to form a fluid-tight joint therewith. Said hub 13 has a radially disposed surface 14 which is suitably ground or lapped, or both, to provide a perfectly flat sealing surface.

Housing 11 is formed with a recess 15 into which is pressed a retainer 16 forming part of a seal hereinafter to be described. Said retainer 16 is provided with a cylindrical portion 17, a radially inwardly extending portion 18 connected to a shoulder 19 and a tubular inner portion 20 adjacent shaft 10. Cylindrical portion 17 is press-fitted into recess 15 so as to form a fluid-tight joint therebetween, and radial wall 18 serves as a means for locating the seal within recess 15.

A washer 22 is received within retainer 16 and is provided with an axially extending rib 23 having a radially disposed surface 24 which is suitably ground or lapped, or both, to form a fluid-tight seal with surface 14 and hub 13. The washer is made of a material which will not wear quickly when frictionally engaging the material of hub 13. One such material is a phenol-formaldehyde resin impregnated with particles of an alloy of tin, lead and antimony. The opening in washer 22 is enlarged at 25 and is just sufficient to pass over shoulder 19. Said shoulder 19 and tubular portion 20 forms an annular opening 26 in which is disposed an endless ring 27 of resilient, deformable material such as rubber, either natural or synthetic, or a combination of the two, having a circular radial cross-section. Such rings are commonly known to the trade as O rings. Said ring 27 is so proportioned relative to the radial dimensions of opening 26 as to be compressed therein initially and thereby forms a fluid-tight connection between washer 22 and tubular section 20 at all times.

Opening 26 is closed off at the left-hand end of tubular portion 20 as viewed in Fig. 1 by a washer 28. Said washer 22 has a radial surface 29 near the left-hand end thereof which forms an abutment for a spring 30 compressed between said radial wall 29 and washer 28. Spring 30 serves to urge washer 22 continuously against hub 13, thereby maintaining the fluid-tight fit between surfaces 14 and 24. The spring 30 also serves to prevent O ring 27 from being pushed off tubular portion 20 of retainer 16.

It will be observed that the space 26 is wider than ring 27 so as to permit said ring to move or roll axially in response to relative axial movement between washer 22 and retainer 16.

Washer 22 is prevented from rotating relative to retainer 16 by means of one or more lugs 31 projecting radially inwardly from cylindrical wall 17 into axially disposed recesses 32 formed in the outer periphery of washer 22. It will be observed that with this arrangement washer 22 may move freely in an axial direction but is prevented from moving rotationally with respect to retainer 16. In order to limit the axial movement of washer 22 relative to retainer 16 one or more tabs 33 is formed in the left-hand end (Fig. 1) of the tubular portion 17 and bent over into the path of movement of washer 22.

The modification shown in Fig. 3 differs from the one shown in Fig. 1 in that the spring is telescoped into the rubber sealing ring. The shaft 35 has mounted thereon a hub 36 of an impeller or the like (not shown) which is pressed on to form a fluid-tight joint with the shaft. Shaft 35 passes through an opening 37 in a housing 38 having a recess 39 therein facing hub 36. In said recess 39 is a retainer 40 having a cylindrical portion 41 which is pressed into recess 39 with a fluid-tight fit. A radial wall 42 on retainer 40 abuts on the bottom of recess 39 and locates retainer 40 with respect to housing 38. A relatively long shoulder 43 extends from radial portion 42 and is connected to an axially extending tubular portion or flange 44. The washer 45 is provided with an axially disposed flange extending over shoulder 43 and the axially extending flange 44 on retainer 40. Said washer is sealed with respect to flange 44 by means of a ring 46, which is preferably a continuous ring of resilient deformable material such as rubber or the like, either natural or synthetic, and having a circular radial cross-section. The dimensions of the ring 46 are such that when it is inserted between washer 45 and flange 44 it will be compressed and will form a fluid-tight seal therebetween.

Washer 45 is provided with an annular rib 47 having a radial surface 48 thereon in contact with a similar radial surface 49 on hub 36, surfaces 48 and 49 being suitably ground or lapped, or both, to provide a fluid-tight running fit.

Washer 45 is continuously urged toward hub 36 by a spring 50 which is compressed between a radial surface 51 on the interior of washer 45 and a radial flange 52 formed on a cup-shaped stamping 53 which is telescoped into tubular portion 44 and is provided with an outwardly extending flange 54 abutting on the end of portion 44. Flange 54 serves to confine ring 46 and at the same time limits the movement of stamping 53 under the action of spring 50.

Washer 45 is prevented from rotating relative to retainer 40 by means of inwardly extending lugs 55 formed in the cylindrical portion 41 of retainer 40 and extending into axially disposed grooves 56 formed in the outer periphery of washer 45.

It is understood that the foregoing description is illustrative of preferred embodiments of this invention and that the scope of the invention is not to be limited thereto, but is to be determined by the appended claims.

What is claimed is:

1. A seal device comprising a washer having an axial flange, a rigid retainer having inner and outer cylindrical walls enclosing a portion of the flange and having an outer cylindrical surface by which the device is supported, a resilient deformable ring compressed between the inside of the flange and the inner cylindrical retainer and effecting a fluid-tight seal therebetween, a member abutting on the inner cylindrical retainer wall and providing a radially disposed wall, and resilient means compressed between the member and the washer to urge the washer out of the retainer.

2. A seal as described in claim 1, said inner cylindrical wall having a step defining one side and the bottom of a recess to receive said resilient deformable sealing ring, and said member abutting on the inner wall defining the third side of the recess.

3. A seal as described in claim 1, said cylindrical wall having a step defining one side and the bottom of a recess to receive said resilient deformable sealing ring, and said member being cup-shaped and telescoped into the inner wall, the said radial wall on the member defining the second side of the recess and the bottom of the cup contacting the resilient means for urging the washer out of the retainer.

FRANK E. PAYNE.

REFERENCES CITED

The following references are of record in the file of this patent:

UNITED STATES PATENTS

| Number | Name | Date |
| --- | --- | --- |
| 1,972,393 | Radford | Sept. 4, 1934 |
| 2,370,964 | Janette | Mar. 6, 1945 |